(12) United States Patent
Miyazaki (10) Patent No.: US 11,381,262 B2
(45) Date of Patent: Jul. 5, 2022

(54) RADIO-FREQUENCY MODULE AND COMMUNICATION DEVICE

(71) Applicant: Murata Manufacturing Co., Ltd., Kyoto (JP)

(72) Inventor: Daisuke Miyazaki, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/337,932

(22) Filed: Jun. 3, 2021

(65) Prior Publication Data

US 2021/0297096 A1 Sep. 23, 2021

Related U.S. Application Data

(63) Continuation of application No. PCT/JP2019/042657, filed on Oct. 30, 2019.

(30) Foreign Application Priority Data

Dec. 6, 2018 (JP) .............................. JP2018-228892

(51) Int. Cl.
*H04B 7/00* (2006.01)
*H04B 1/00* (2006.01)
*H04L 5/00* (2006.01)

(52) U.S. Cl.
CPC ........... *H04B 1/0078* (2013.01); *H04B 1/006* (2013.01); *H04L 5/0046* (2013.01)

(58) Field of Classification Search
CPC ..... H04B 1/0078; H04B 1/006; H04L 5/0046; H04L 5/1461; H04L 5/001

(Continued)

(56) References Cited

U.S. PATENT DOCUMENTS

2009/0180403 A1* 7/2009 Tudosoiu ............. H04B 1/0483
370/278
2012/0113873 A1 5/2012 Sanchez et al.
(Continued)

FOREIGN PATENT DOCUMENTS

WO 2018/116961 A1 6/2018

OTHER PUBLICATIONS

International Search Report for International Application No. PCT/JP2019/042657 dated Dec. 10, 2019.
(Continued)

*Primary Examiner* — Tanmay K Shah
(74) *Attorney, Agent, or Firm* — Pearne & Gordon LLP (57) ABSTRACT

A radio-frequency module supports carrier aggregation in which radio-frequency signals in a plurality of frequency ranges are simultaneously transmitted, simultaneously received, or simultaneously transmitted and received. The radio-frequency module includes a plurality of first filters, a plurality of second filters, a switch coupled to an antenna element and the plurality of first filters and configured to control connection and disconnection between the antenna element and each of the plurality of first filters, and a switch coupled to the antenna element and the plurality of second filters and configured to control connection and disconnection between the antenna element and each of the plurality of second filters. No combination of filters selected from both the plurality of first filters and the plurality of second filters are used for carrier aggregation.

18 Claims, 5 Drawing Sheets

(58) Field of Classification Search
USPC .......................................................... 375/262
See application file for complete search history.

(56) References Cited

U.S. PATENT DOCUMENTS

| | | | | |
|---|---|---|---|---|
| 2013/0322309 A1* | 12/2013 | Smith | .................. | H04L 5/14 |
| | | | | 370/281 |
| 2014/0295775 A1* | 10/2014 | Rousu | ................. | H04L 5/001 |
| | | | | 455/73 |
| 2015/0133067 A1* | 5/2015 | Chang | ................. | H04B 1/006 |
| | | | | 455/78 |
| 2016/0365878 A1* | 12/2016 | Balm | .................. | H04B 1/006 |
| 2017/0063427 A1* | 3/2017 | Lee | .................... | H04B 1/126 |
| 2019/0273528 A1 | 9/2019 | Watanabe | | |

OTHER PUBLICATIONS

Written Opinion for International Application No. PCT/JP2019/042657 dated Dec. 10, 2019.

\* cited by examiner

RADIO-FREQUENCY MODULE AND COMMUNICATION DEVICE

CROSS REFERENCE TO RELATED APPLICATIONS

This is a continuation of International Application No. PCT/JP2019/042657 filed on Oct. 30, 2019 which claims priority from Japanese Patent Application No. 2018-228892 filed on Dec. 6, 2018. The contents of these applications are incorporated herein by reference in their entireties.

BACKGROUND

Technical Field

The present disclosure relates to a radio-frequency module and a communication device including the radio-frequency module.

In recent years, mobile phones have been required to support multiple frequency ranges and radio systems with a single terminal (multiband and multimode operations). Front-end circuits supporting multiband and multimode operations are required to reduce quality degradation of transmit and receive signals when the front-end circuits employ carrier aggregation (hereinafter referred to as CA) in which a single antenna simultaneously deals with a plurality of transmit or receive signals in different frequency ranges as one communication signal.

Patent Document 1 discloses a front-end module supporting CA. To implement CA, a high-band antenna switch module (HB_ASM) or a low-band antenna switch module (LB_ASM) connects two or more filters to a high-band antenna (HB_ANT) or a low-band antenna (LB_ANT) in the front-end module of Patent Document 1.

Patent Document 1: U.S. Patent Application Publication No. 2015/0133067

BRIEF SUMMARY

In the related art described above, many filters are coupled to one antenna to support many frequency ranges. Thus, terminals of the switch module coupled to the filters increase in number. As the number of terminals of the switch module increases, parasitic capacitance (hereinafter referred to as off-capacitance) of disconnected terminals increases. This results in degradation of the bandpass characteristic and also increase in the reflection coefficient due to degraded impedance matching, which worsens the quality of transmit and receive signals in CA.

The present disclosure provides a radio-frequency module and the like capable of suppressing the quality degradation of transmit and receive signals in CA due to off-capacitance of switches.

A radio-frequency module according to an aspect of the present disclosure is a radio-frequency module supporting carrier aggregation in which radio-frequency signals in a plurality of frequency ranges are simultaneously transmitted, simultaneously received, or simultaneously transmitted and received. The radio-frequency module includes a plurality of first filters, a plurality of second filters, a first switch coupled to an antenna element and the plurality of first filters and configured to control connection and disconnection between the antenna element and each of the plurality of first filters, and a second switch coupled to the antenna element and the plurality of second filters and configured to control connection and disconnection between the antenna element and each of the plurality of second filters. No combination of filters selected from both the plurality of first filters and the plurality of second filters are used for carrier aggregation.

The present disclosure can suppress the quality degradation of transmit and receive signals in CA due to off-capacitance of the switches.

DETAILED DESCRIPTION

Hereinafter, embodiments and the modification of the present disclosure will be described in detail with reference to the drawings. It should be noted that the embodiments and modification described below are all specific or comprehensive instances. Specifics including numerical values, shapes, materials, constituent elements, arrangements of the constituent elements, and modes of connection given in the following embodiments and modification are mere instances and are not intended to limit the present disclosure. Among the constituent elements in the following embodiment and modification, constituent elements not recited in any of the independent claims are described as arbitrary constituent elements.

In the present disclosure, the expression "coupled" includes not only the case in which a circuit element is directly coupled to another circuit element by using a connection terminal and/or a wiring conductor but also the case in which a circuit element is electrically coupled to another circuit element via still another circuit element.

First Embodiment

Firstly, a first embodiment will be specifically described with reference to FIGS. 1 and 2.

[1.1 Circuit Configuration of Communication Device 5]

Firstly, a circuit configuration of a communication device 5 according to the present embodiment will be specifically described with reference to FIG. 1. FIG. 1 is a circuit configuration diagram of the communication device 5 according to the first embodiment.

The communication device 5 is a device supporting carrier aggregation (CA). CA is a communication technology of simultaneously transmitting, simultaneously receiving, or simultaneously transmitting and receiving radio-frequency signals of a plurality of frequency ranges. More specifically, CA simultaneously achieves (i) transmission and/or reception of radio-frequency signals in a given frequency range and (ii) transmission and/or reception of radio-frequency signals in another frequency range different from the given frequency range.

In the present disclosure, inter-band CA, which uses a combination of a plurality of non-contiguous frequency ranges, and intra-band CA, which uses a combination of a plurality of contiguous frequency ranges, are not distinguished from each other and collectively referred to simply as CA; in other words, CA in the present disclosure may include both inter-band CA and intra-band CA.

Figure 1:
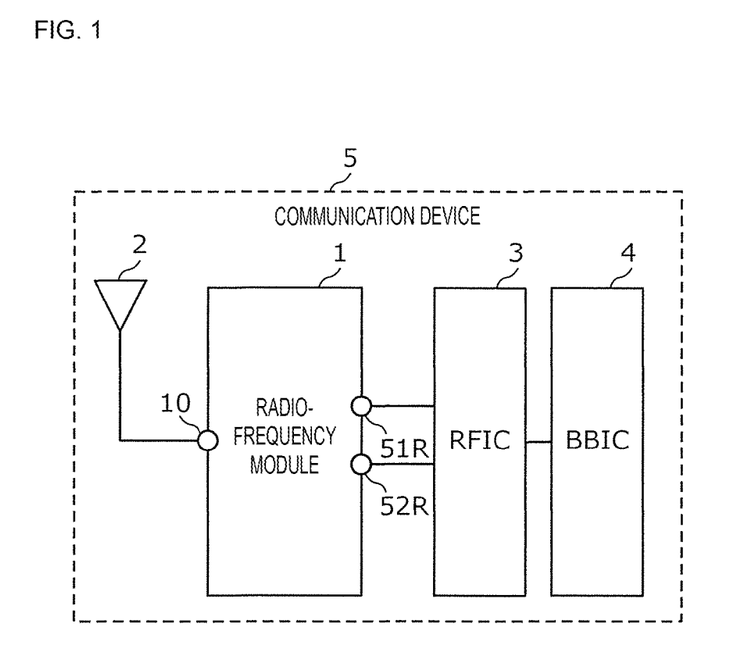
FIG. 1 is a circuit configuration diagram of a communication device according to a first embodiment.

As illustrated in FIG. 1, the communication device 5 includes a radio-frequency module 1, an antenna element 2, a radio-frequency integrated circuit (RFIC) 3, and a baseband integrated circuit (BBIC) 4.

The RFIC 3 is a radio-frequency integrated circuit that processes a high frequency signal received or to be transmitted by the antenna element 2. Specifically, the RFIC 3 processes a radio-frequency receive signal inputted and communicated via receive output terminals 51R and 52R of the radio-frequency module 1 by performing, for example, downconversion and outputs the processed receive signal generated by the signal processing to the BBIC 4.

The BBIC 4 performs signal processing by using an intermediate frequency range lower than radio-frequency signals propagating the radio-frequency module 1. The signal processed by the BBIC 4 is used as, for example, an image signal for displaying an image or a sound signal for calls through a speaker.

The antenna element 2 is coupled to a common terminal 10 of the radio-frequency module 1. The antenna element 2 receives a radio-frequency signal from outside and outputs the radio-frequency signal to the radio-frequency module 1.

The antenna element 2 and the BBIC 4 are optional constituent elements for the communication device according to the present disclosure.

[1.2 Circuit Configuration of Radio-Frequency Module 1]

Next, a circuit configuration of the radio-frequency module 1 will be specifically described with reference to FIG. 2. FIG. 2 is a circuit configuration diagram of the radio-frequency module 1 according to the first embodiment.

The radio-frequency module 1 functions as a receive circuit supporting CA. In the drawing, filters with hatching indicate filters supporting CA, and filters without necessarily hatching indicate filters not supporting CA.

The filter supporting CA denotes a filter used for CA with other filters; specifically, the filter supporting CA has a pass band corresponding to a frequency range (communication band) used in CA. By contrast, the filter not supporting CA denotes a filter not used for CA; specifically, the filter not supporting CA has a pass band corresponding to a frequency range not used in CA.

Figure 2:
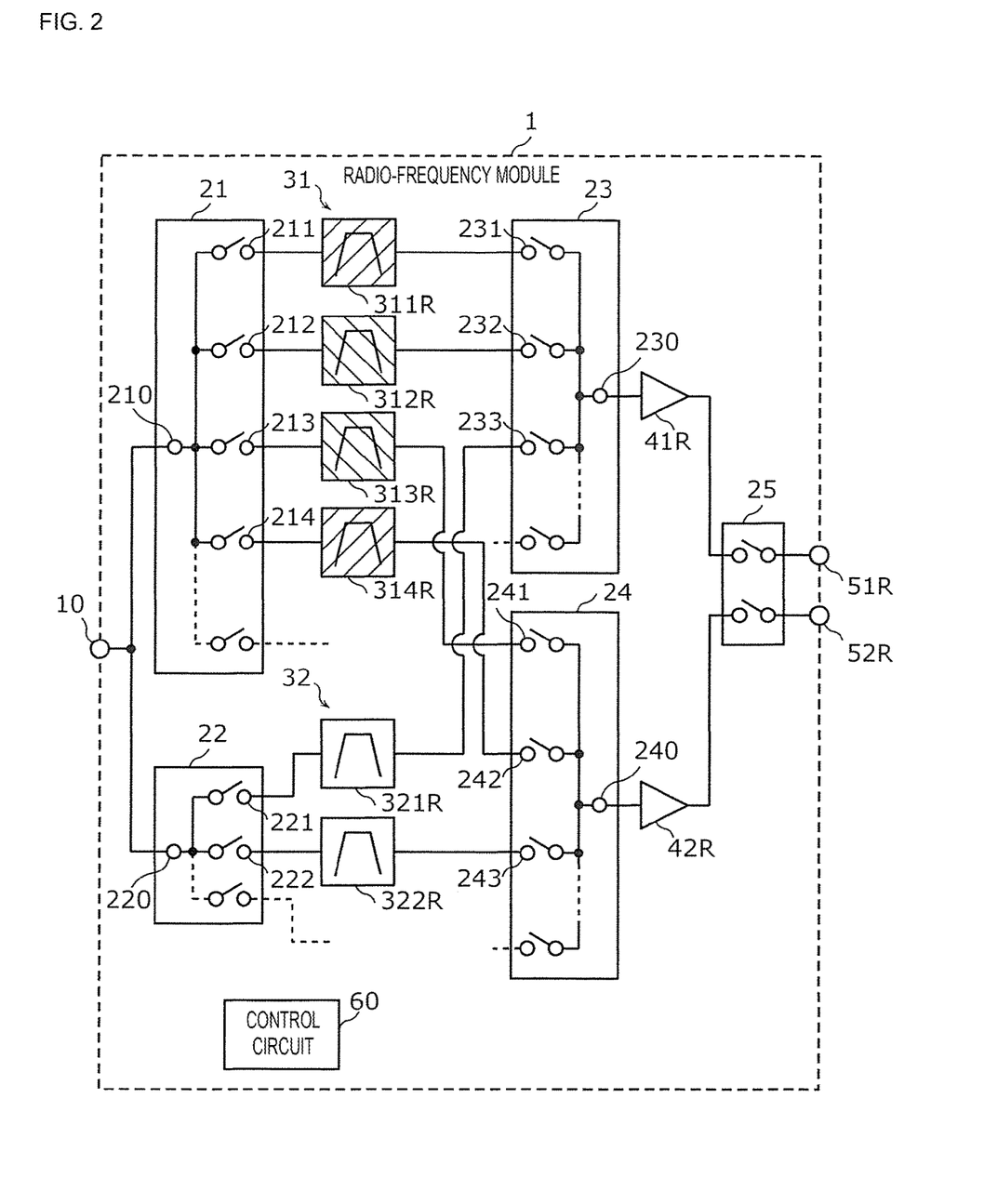
FIG. 2 is a circuit configuration diagram of a radio-frequency module according to the first embodiment.

As illustrated in FIG. 2, the radio-frequency module 1 includes the common terminal 10, switches 21 to 25, a plurality of first filters 31, a plurality of second filters 32, receive low-noise amplifiers 41R and 42R, the receive output terminals 51R and 52R, and a control circuit 60.

The common terminal 10 is coupled to the antenna element 2.

The switch 21 is an example of a first switch. The switch 21 is coupled to the antenna element 2 and the plurality of first filters 31. The switch 21 controls connection and disconnection between the antenna element 2 and each of the plurality of first filters 31.

The switch 21 enables two or more of the plurality of first filters 31 to be concurrently coupled to the antenna element 2. For example, the switch 21 enables receive filters 311R and 314R of the plurality of first filters 31 to be concurrently coupled to the antenna element 2. For example, the switch 21 enables receive filters 312R and 313R of the plurality of first filters 31 to be concurrently coupled to the antenna element 2.

Here, an internal configuration of the switch 21 is described. As illustrated in FIG. 2, the switch 21 includes a common terminal 210 coupled to the antenna element 2 and also includes a plurality of selection terminals including selection terminals 211 to 214 respectively coupled to the receive filters 311R to 314R. The switch 21 is a multi-connection switch configured to control connection and disconnection between the common terminal 210 and each of the plurality of selection terminals including the selection terminals 211 to 214 in an individual manner.

The switch 22 is an example of a second switch. The switch 22 is coupled to the antenna element 2 and the plurality of second filters 32. The switch 22 controls connection and disconnection between the antenna element 2 and each of the plurality of second filters 32. For example, the switch 22 is a discrete component physically positioned apart from the switch 21 to achieve isolation from the switch 21.

In the present embodiment, the switch 22 prevents two or more of the plurality of second filters 32 from being concurrently coupled to the antenna element 2. For example, the switch 22 cannot concurrently couple receive filters 321R and 322R included in the plurality of second filters 32 to the antenna element 2.

Here, an internal configuration of the switch 22 is described. As illustrated in FIG. 2, the switch 22 includes a common terminal 220 coupled to the antenna element 2 and also includes a plurality of selection terminals including selection terminals 221 and 222 respectively coupled to the receive filters 321R and 322R. For example, the switch 22 is a single-pole n-throw (SPNT) switch configured to couple any of the plurality of selection terminals to the common terminal 220.

The switches 21 and 22 prevent any of the plurality of first filters 31 from being coupled to the antenna element and also prevent any of the plurality of second filters 32 from being coupled to the antenna element 2. This means that, when the switch 22 couples any of the plurality of second filters 32 to the antenna element 2, the switch 21 cannot couple any of the plurality of first filters 31 to the antenna element 2. Conversely, when the switch 21 couples any of the plurality of first filters 31 to the antenna element 2, the switch 22 cannot couple any of the plurality of second filters 32 to the antenna element 2.

The isolation between any terminal of the switch 21 and any terminal of the switch 22 is established at a level higher than the level of the isolation between terminals of the switch 21 and the level of the isolation between terminals of the switch 22. For example, the shortest distance between the selection terminals 211 to 214 of the switch 21 and the selection terminals 221 and 222 of the switch 22 is greater than the shortest distance between the selection terminals 211 to 214 of the switch 21 and the shortest distance between the selection terminals 221 and 222 of the switch 22. When such a condition is satisfied, the switches 21 and 22 are not necessarily discrete components but may be implemented as, for example, one chip.

The switch 23 is coupled to two or more receive filters (the receive filters 311R, 312R, and 321R in FIG. 2) out of the plurality of first filters 31 and the plurality of second filters 32 and also coupled to the receive low-noise amplifier 41R. The switch 23 controls connection and disconnection between each of the two or more coupled receive filters and the receive low-noise amplifier 41R.

Specifically, the switch 23 includes a common terminal 230 coupled to the receive low-noise amplifier 41R and also includes a plurality of selection terminals including selection terminals 231 to 233 respectively coupled to the receive filters 311R, 312R, and 321R. For example, the switch 23 is an SPNT switch configured to couple any of the plurality of selection terminals to the common terminal 230.

The switch 24 is coupled to two or more receive filters (the receive filters 313R, 314R, and 322R in FIG. 2) out of the plurality of first filters 31 and the plurality of second filters 32 and also coupled to the receive low-noise amplifier 42R. The switch 24 controls connection and disconnection between each of the two or more coupled filters and the receive low-noise amplifier 42R.

Specifically, the switch 24 includes a common terminal 240 coupled to the receive low-noise amplifier 42R and also includes a plurality of selection terminals including selection terminals 241 to 243 respectively coupled to the receive filter 313R, 314R and 322R. For example, the switch 24 is an SPNT switch configured to couple any of the plurality of selection terminals to the common terminal 240.

The switch 25 is coupled to the receive low-noise amplifiers 41R and 42R and the receive output terminals 51R and 52R. The switch 25 controls connection and disconnection between the receive low-noise amplifier 41R and the receive output terminal 51R and also controls connection and disconnection between the receive low-noise amplifier 42R and the receive output terminal 52R. The switch 25 is composed of, for example, two single-pole single-throw (SPST) switches configured to individually perform switching.

It should be noted that the switches 23 to 25 are optional constituent elements for the radio-frequency module according to the present disclosure.

The plurality of first filters 31 including the receive filters 311R to 314R are coupled to the switch 21. At least one of the plurality of first filters 31 is used for CA together with another of the plurality of first filters 31. This means that the plurality of first filters 31 includes at least one pair of filters supporting CA. For example, the plurality of first filters 31 may be all filters supporting CA.

Specifically, the plurality of first filters 31 include at least one receive filter of receive filters having pass bands corresponding to, for example, the following Long Term Evolution (LTE) communication bands.
(1) Band 8 (receive band: 925 to 960 MHz)
(2) Band 26 (receive band: 859 to 894 MHz)
(3) Band 20 (receive band: 791 to 821 MHz)
(4) Band 28a (receive band: 758 to 788 MHz)
(5) Band 28b (receive band: 773 to 803 MHz)
(6) Band 29 (receive band: 717 to 728 MHz)
(7) Band 12 (receive band: 729 to 746 MHz)
(8) Band 13 (receive band: 746 to 756 MHz)

The receive filter 311R is disposed in a receive path connecting the selection terminal 211 of the switch 21 and the selection terminal 231 of the switch 23. The receive filter 311R is configured to pass radio-frequency signals in a first receive band out of radio-frequency signals inputted from the common terminal 10.

The receive filter 312R is disposed in a receive path connecting the selection terminal 212 of the switch 21 and the selection terminal 232 of the switch 23. The receive filter 312R is configured to pass radio-frequency signals in a second receive band out of radio-frequency signals inputted from the common terminal 10.

The receive filter 313R is disposed in a receive path connecting the selection terminal 213 of the switch 21 and the selection terminal 241 of the switch 24. The receive filter 313R is configured to pass radio-frequency signals in a third receive band out of radio-frequency signals inputted from the common terminal 10. The third receive band is used in CA in combination with the second receive band. This means that the receive filter 313R is used for CA together with the receive filter 312R.

The receive filter 314R is disposed in a receive path connecting the selection terminal 214 of the switch 21 and the selection terminal 242 of the switch 24. The receive filter 314R is configured to pass radio-frequency signals in a fourth receive band out of radio-frequency signals inputted from the common terminal 10. The fourth receive band is used in CA in combination with the first receive band. This means that the receive filter 314R is used for CA together with the receive filter 311R.

The plurality of second filters 32 including the receive filters 321R and 322R are coupled to the switch 22. None of the plurality of second filters 32 are used for CA together with the plurality of first filters 31. Additionally, none of the plurality of second filters 32 are used for CA together with any of the plurality of second filters 32. This means that in the present embodiment the plurality of second filters 32 are all filters not supporting CA.

Specifically, the plurality of second filters 32 include at least one receive filter of receive filters having pass bands corresponding to, for example, the following LTE communication bands.
(9) Band 14 (receive band: 758 to 768 MHz)
(10) Band 71 (receive band: 617 to 652 MHz)

The receive filter 321R is disposed in a receive path connecting the selection terminal 221 of the switch 22 and the selection terminal 233 of the switch 23. The receive filter 321R is configured to pass radio-frequency signals in a fifth receive band out of radio-frequency signals inputted from the common terminal 10. The fifth receive band is not used in CA in combination with any of the first to fourth receive bands corresponding to the receive filters 311R to 314R. This means that the receive filter 321R is not used for CA together with any of the receive filters 311R to 314R.

The receive filter 322R is disposed in a receive path connecting the selection terminal 222 of the switch 22 and the selection terminal 243 of the switch 24. The receive filter 322R is configured to pass radio-frequency signals in a sixth receive band out of radio-frequency signals inputted from the common terminal 10. The sixth receive band is not used in CA in combination with any of the first to fifth receive bands. This means that the receive filter 322R is not used for CA together with any of the receive filters 311R to 314R and 321R.

As such, no combination of filters selected from the plurality of first filters 31 coupled to the switch 21 and the plurality of second filters 32 coupled to the switch 22 are used for CA. This means that any combination of at least one of the plurality of first filters 31 and at least one of the plurality of second filters 32 are not used for CA; in other words, none of the plurality of second filters 32 are used for CA in combination with any of the plurality of first filters 31.

The plurality of first filters 31 and the plurality of second filters 32 may be, but not limited to, surface acoustic wave filters, acoustic wave filters using a bulk acoustic wave (BAW), film bulk acoustic resonator (FBAR) filters, LC resonance filters, or dielectric filters.

The receive low-noise amplifiers 41R and 42R are an example of at least one amplifier circuit coupled to at least one of the plurality of first filters 31 and the plurality of second filters 32 and configured to amplify radio-frequency signals. The receive low-noise amplifiers 41R and 42R, each amplifies with low noise radio-frequency signals inputted from the antenna element 2 through any of the plurality of first filters 31 and the plurality of second filters 32. The receive low-noise amplifiers 41R and 42R are both, for example, low-noise amplifiers.

The switch 23 selectively couples the receive low-noise amplifier 41R to two or more of the plurality of first filters 31 and the plurality of second filters 32. Specifically, the receive low-noise amplifier 41R selectively establishes connection to the receive filters 311R, 312R, and 321R. For example, when the pass band of the receive filter 311R, the pass band of the receive filter 312R, and the pass band of the receive filter 321R are close to each other, the receive low-noise amplifier 41R can be implemented as a low-noise amplifier capable of efficiently amplifying radio-frequency signals in a frequency range including the pass band of the receive filter 311R, the pass band of the receive filter 312R, and the pass band of the receive filter 321R. The radio-frequency signal amplified by the receive low-noise amplifier 41R is outputted from the receive output terminal 51R via the switch 25.

The switch 24 selectively couples the receive low-noise amplifier 42R to two or more of the plurality of first filters 31 and the plurality of second filters 32. Specifically, the receive low-noise amplifier 42R selectively establishes connection to the receive filters 313R, 314R, and 322R. For example, when the pass band of the receive filter 313R, the pass band of the receive filter 314R, and the pass band of the receive filter 322R are close to each other, the receive low-noise amplifier 42R can be implemented as a low-noise amplifier capable of efficiently amplifying radio-frequency signals in a frequency range including the pass band of the receive filter 313R, the pass band of the receive filter 314R, and the pass band of the receive filter 322R. The radio-frequency signal amplified by the receive low-noise amplifier 42R is outputted from the receive output terminal 52R via the switch 25.

The control circuit 60 controls connections of the switches 21 to 25 in accordance with communication bands (frequency ranges) in use. Specifically, the control circuit 60 controls connections of the switches 21 to 25 by using a control signal (not indicated in the drawing).

More specifically, the control circuit 60 controls the switches 21 and 22 to prevent one or more of the plurality of first filters 31 from being coupled to the antenna element 2 and also prevent one or more of the plurality of second filters 32 from being coupled to the antenna element 2. The control circuit 60 controls the switch 21 to enable two or more of the plurality of first filters 31 to be concurrently coupled to the antenna element 2. The control circuit 60 controls the switch 22 to prevent two or more of the plurality of second filters 32 from being concurrently coupled to the antenna element 2.

For example, when CA is implemented by using a combination of the first receive band corresponding to the receive filter 311R and the fourth receive band corresponding to the receive filter 314R, the control circuit 60 controls the switches 21 and 23 to 25 to establish connection through a receive path connecting the antenna element 2, the receive filter 311R, the receive low-noise amplifier 41R, and the receive output terminal 51R and connection through a receive path connecting the antenna element 2, the receive filter 314R, the receive low-noise amplifier 42R, and the receive output terminal 52R. At this time, the control circuit 60 also controls the switch 22 to prevent connections through receive paths connecting the antenna element 2 and the plurality of second filters 32.

For example, when CA is implemented by using a combination of the second receive band corresponding to the receive filter 312R and the third receive band corresponding to the receive filter 313R, the control circuit 60 controls the switches 21 and 23 to 25 to establish connection through a receive path connecting the antenna element 2, the receive filter 312R, the receive low-noise amplifier 41R, and the receive output terminal 51R and connection through a receive path connecting the antenna element 2, the receive filter 313R, the receive low-noise amplifier 42R, and the receive output terminal 52R. At this time, the control circuit 60 also controls the switch 22 to prevent connections through receive paths connecting the antenna element 2 and the plurality of second filters 32.

It should be noted that each of the first to fourth receive bands can be solely used for communication. For example, when the first receive band is solely used for communication, the control circuit 60 controls the switches 21, 23, and 25 to not establish connection through the receive path connecting the antenna element 2, the receive filter 311R, the receive low-noise amplifier 41R, and the receive output terminal 51R and connection through the receive path connecting the antenna element 2, the receive filter 314R, the receive low-noise amplifier 42R, and the receive output terminal 52R.

The fifth and sixth receive bands are not used in CA. Thus, the fifth and sixth receive bands are each solely used for communication. For example, when the fifth receive band is solely used for communication, the control circuit 60 controls the switches 22, 23, and 25 to establish connection through a receive path connecting the antenna element 2, the receive filter 321R, the receive low-noise amplifier 41R, and the receive output terminal 51R. At this time, the control circuit 60 also controls the switch 21 to prevent connections through receive paths connecting the antenna element 2 and the plurality of first filters 31.

For example, when the sixth receive band is solely used for communication, the control circuit 60 controls the switches 22, 24, and 25 to establish connection through a receive path connecting the antenna element 2, the receive filter 322R, the receive low-noise amplifier 42R, and the receive output terminal 52R. At this time, the control circuit 60 also controls the switch 21 to prevent connections through receive paths connecting the antenna element 2 and the plurality of first filters 31.

The control circuit 60 may be provided outside the radio-frequency module 1; for example, the control circuit 60 may be provided in the RFIC 3 or the BBIC 4. This means that the control circuit 60 is an optional constituent element for the radio-frequency module according to the present disclosure.

[1.3 Effects]

As described above, in the radio-frequency module 1 and the communication device 5 according to the present embodiment, the plurality of first filters 31 can be coupled to the switch 21, and the plurality of second filters 32 can be coupled to the switch 22. As a result, the terminals of the switches 21 and 22 are fewer than the terminals of a single switch if all the plurality of first filters 31 and the plurality of second filters 32 coupled to the antenna element 2 are coupled to the single switch. This can reduce off-capacitance of the individual switches. Furthermore, in the radio-frequency module 1 and the communication device 5 according to the present embodiment, no combination of filters selected from both the plurality of first filters 31 and the plurality of second filters 32 are used for CA. This means that the switches 21 and 22 prevent one or more of the plurality of first filters 31 from being coupled to the antenna element 2 and also prevent one or more of the plurality of second filters 32 from being coupled to the antenna element 2. This can eliminate the effect of off-capacitance of both the switches 21 and 22 on the quality of transmit and receive signals in CA. Consequently, it is possible to suppress the quality degradation of transmit and receive signals in CA due to off-capacitance of the switches.

Further, in the radio-frequency module 1 and the communication device 5 according to the present embodiment, at least one of the plurality of first filters 31 is used for CA together with another of the plurality of first filters 31, whereas none of the plurality of second filters 32 is used for CA together with any of the plurality of second filters 32. This means that the switch 21 enables two or more of the plurality of first filters 31 to be concurrently coupled to the antenna element 2, whereas the switch 22 prevents two or more of the plurality of second filters 32 from being concurrently coupled to the antenna element 2. Thus, any one of the plurality of selection terminals of the switch 22 can be coupled to the common terminal, which simplifies the configuration of the switch 22. Additionally, because the filters supporting CA are collected in the switch 21, any combination of the filters supporting CA can be flexibly implemented.

Moreover, the radio-frequency module 1 and the communication device 5 according to the present embodiment can include the receive low-noise amplifiers 41R and 42R respectively coupled to two or more receive filters of the plurality of first filters 31 and two or more receive filters of the plurality of second filters 32. This can reduce the receive low-noise amplifiers in the radio-frequency module 1 and the communication device 5 as compared with the receive low-noise amplifiers if the receive filters are coupled to the receive low-noise amplifiers in one-to-one correspondence. As a result, it is possible to reduce components and consequently downsize the radio-frequency module 1.

Modification of First Embodiment

Next, a modification to the first embodiment will be described. This modification differs from the first embodiment mainly in that receive low-noise amplifiers are coupled to receive filters in one-to-one correspondence. Hereinafter, the modification will be specifically described with reference to FIG. 3 with a focus on the point different from the first embodiment. The circuit configuration of a communication device according to the modification is made by only replacing the radio-frequency module 1 of the communication device in FIG. 1 with a radio-frequency module 1A according to the modification, and descriptions and drawings thereof are omitted.

[2.1 Circuit Configuration of Radio-Frequency Module 1A]

Figure 3:
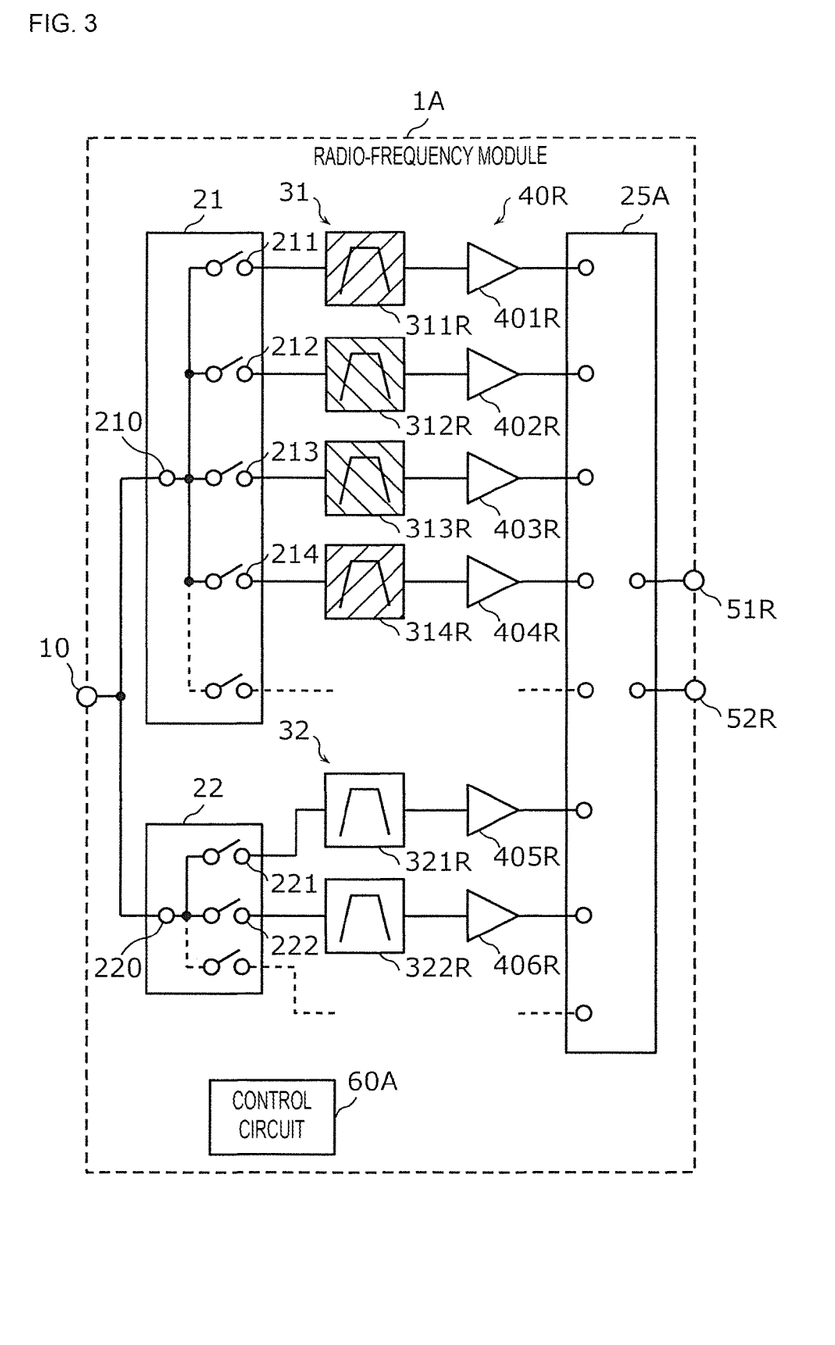
FIG. 3 is a circuit configuration diagram of a radio-frequency module according to a modification of the first embodiment.

Next, a circuit configuration of the radio-frequency module 1A according to the modification will be specifically described with reference to FIG. 3. FIG. 3 is a circuit configuration diagram of the radio-frequency module 1A according to the modification of the first embodiment.

As illustrated in FIG. 3, the radio-frequency module 1A includes the common terminal 10, switches 21, 22, and 25A, the plurality of first filters 31, the plurality of second filters 32, a plurality of receive low-noise amplifiers 40R, the receive output terminals 51R and 52R, and a control circuit 60A.

The plurality of receive low-noise amplifiers 40R are an example of at least one amplifier circuit coupled to at least one of the plurality of first filters 31 and the plurality of second filters 32 and configured to amplify radio-frequency signals. The plurality of receive low-noise amplifiers 40R are coupled in one-to-one correspondence to the receive filters included in the plurality of first filters 31 and the plurality of second filters 32. Specifically, the plurality of receive low-noise amplifiers 40R include receive low-noise amplifiers 401R to 406R.

The receive low-noise amplifiers 401R to 406R are respectively coupled to the receive filters 311R to 314R, 321R, and 322R. The receive low-noise amplifiers 401R to 406R are also coupled to the switch 25A. The receive low-noise amplifiers 401R to 406R, each amplifies with low noise a radio-frequency signal inputted from the antenna element 2 through a corresponding one of the receive filters 311R to 314R, 321R, and 322R. The radio-frequency signals amplified by the receive low-noise amplifiers 401R to 406R are outputted from the receive output terminal 51R or 52R via the switch 25A.

The switch 25A is coupled to the plurality of receive low-noise amplifiers 40R and the receive output terminals 51R and 52R. The switch 25A individually controls connections and disconnections between the plurality of receive low-noise amplifiers 40R and the receive output terminals 51R and 52R. This means that the switch 25A can couple each of the plurality of receive low-noise amplifiers 40R to either the receive output terminal 51R or 52R.

It should be noted that the switch 25A is an optional constituent element for the radio-frequency module according to the present disclosure. When the radio-frequency module 1A excludes the switch 25A, the radio-frequency module 1A can include a plurality of receive output terminals coupled to the plurality of receive low-noise amplifiers 40R in one-to-one correspondence.

The control circuit 60A controls connections of the switches 21, 22, and 25A in accordance with communication bands (frequency ranges) in use. Specifically, the control circuit 60A controls connections of the switches 21, 22, and 25A by using a control signal (not indicated in the drawing).

More specifically, the control circuit 60A controls the switches 21 and 22 in the same manner as the control circuit 60 of the first embodiment. The control circuit 60A also controls the switch 25A to couple to the receive output terminal 51R or 52R the receive filters and receive low-noise amplifiers coupled to the antenna element 2 by the switches 21 and 22.

[2.2 Effects]

As described above, the radio-frequency module 1A and the communication device 5 according to the modification can include the plurality of receive low-noise amplifiers 40R coupled in one-to-one correspondence to the plurality of receive filters included in the plurality of first filters 31 and the plurality of second filters 32. This enables efficient amplification of radio-frequency signals with the use of receive low-noise amplifiers suitable for the pass bands of the receive filters.

Second Embodiment

Next, a second embodiment will be described. The present embodiment differs from the first embodiment mainly in that the radio-frequency module functions as a transceiver circuit. Hereinafter, the present embodiment will be specifically described with reference to FIGS. 4 and 5 with a focus on the point different from the first embodiment.

[3.1 Circuit Configuration of Communication Device 5B]

Figure 4:
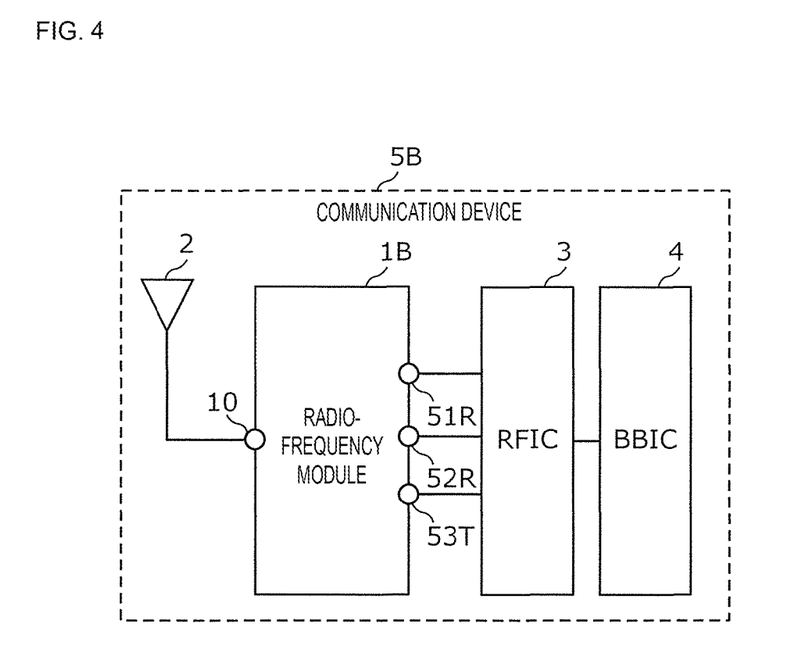
FIG. 4 is a circuit configuration diagram of a communication device according to a second embodiment.

Firstly, a circuit configuration of a communication device 5B according to the present embodiment will be specifically described with reference to FIG. 4. FIG. 4 is a circuit configuration diagram of the communication device 5B according to the second embodiment.

The communication device 5B according to the present embodiment includes a radio-frequency module 1B, the antenna element 2, the RFIC 3, and the BBIC 4.

The radio-frequency module 1B includes a transmit input terminal 53T in addition to the receive output terminals 51R and 52R. A radio-frequency signal is inputted from the transmit input terminal 53T to the radio-frequency module 1B.

[3.2 Circuit Configuration of Radio-Frequency Module 1B]

Figure 5:
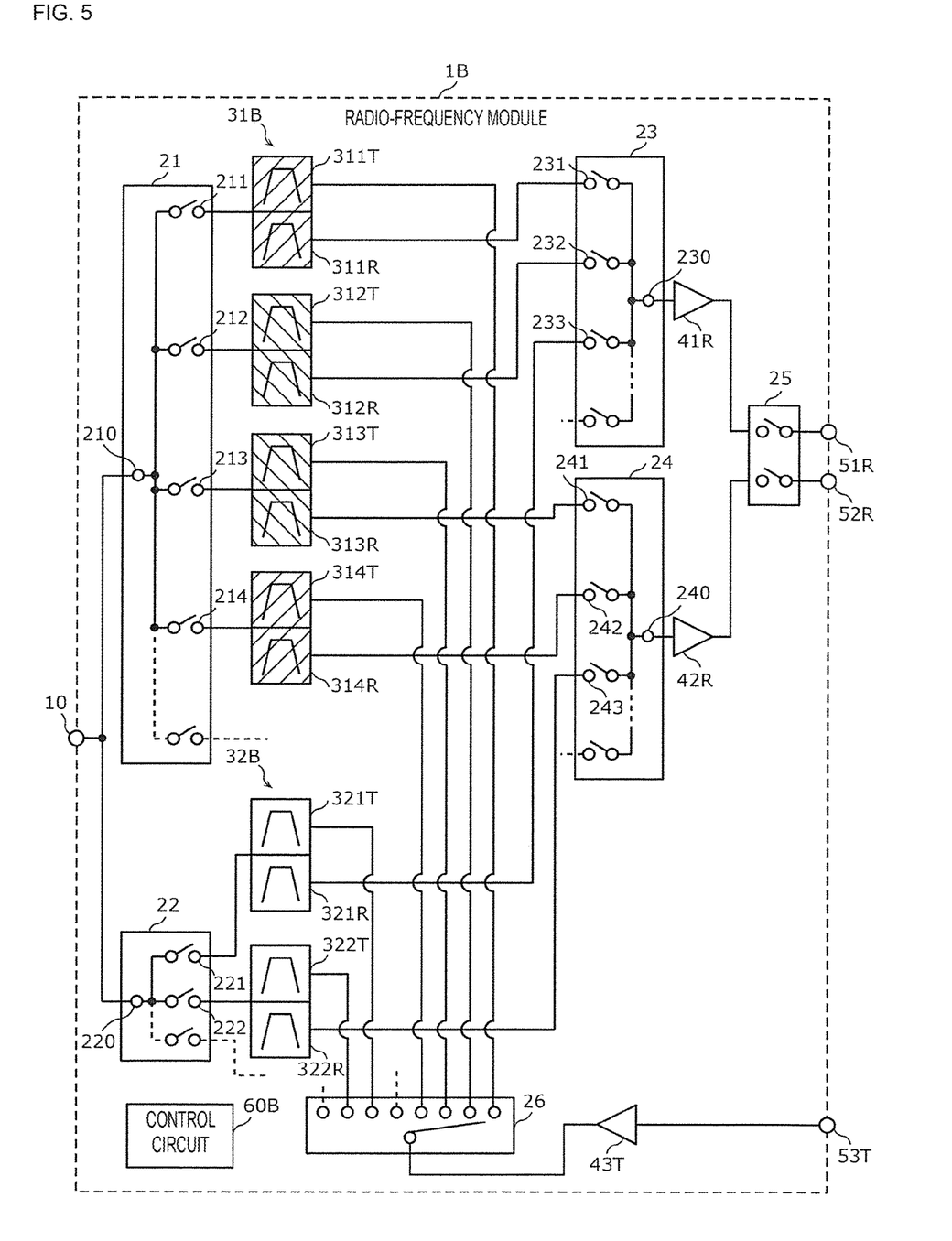
FIG. 5 is a circuit configuration diagram of a radio-frequency module according to the second embodiment.

Next, a circuit configuration of the radio-frequency module 1B will be specifically described with reference to FIG. 5. FIG. 5 is a circuit configuration diagram of the radio-frequency module 1B according to the second embodiment.

The radio-frequency module 1B functions as a transceiver circuit supporting CA. As illustrated in FIG. 5, the radio-frequency module 1B includes the common terminal 10, switches 21 to 26, a plurality of first filters 31B, a plurality of second filters 32B, the receive low-noise amplifiers 41R and 42R, a transmit power amplifier 43T, the receive output terminals 51R and 52R, the transmit input terminal 53T, and a control circuit 60B.

The switch 26 is coupled to a plurality of transmit filters (including transmit filters 311T to 314T in FIG. 5) out of the plurality of first filters 31B and a plurality of transmit filters (including transmit filters 321T and 322T in FIG. 5) out of the plurality of second filters 32B and also coupled to the transmit power amplifier 43T. The switch 26 controls connections and disconnections between two or more of the coupled transmit filters and the transmit power amplifier 43T. The switch 26 may be, for example, an SPNT switch.

The plurality of first filters 31B include the transmit filters 311T to 314T in addition to the receive filters 311R to 314R.

The transmit filter 311T is disposed in a transmit path connecting a selection terminal of the switch 26 and the selection terminal 211 of the switch 21. The transmit filter 311T is configured to pass radio-frequency signals in a first transmit band out of radio-frequency signals inputted from the transmit input terminal 53T.

The transmit filter 312T is disposed in a transmit path connecting a selection terminal of the switch 26 and the selection terminal 212 of the switch 21. The transmit filter 312T is configured to pass radio-frequency signals in a second transmit band out of radio-frequency signals inputted from the transmit input terminal 53T.

The transmit filter 313T is disposed in a transmit path connecting a selection terminal of the switch 26 and the selection terminal 213 of the switch 21. The transmit filter 313T is configured to pass radio-frequency signals in a third transmit band out of radio-frequency signals inputted from the transmit input terminal 53T.

The transmit filter 314T is disposed in a transmit path connecting a selection terminal of the switch 26 and the selection terminal 214 of the switch 21. The transmit filter 314T is configured to pass radio-frequency signals in a fourth transmit band out of radio-frequency signals inputted from the transmit input terminal 53T.

The plurality of second filters 32B include the transmit filters 321T and 322T in addition to the receive filters 321R and 322R.

The transmit filter 321T is disposed in a transmit path connecting a selection terminal of the switch 26 and the selection terminal 221 of the switch 22. The transmit filter 321T is configured to pass radio-frequency signals in a fifth transmit band out of radio-frequency signals inputted from the transmit input terminal 53T.

The transmit filter 322T is disposed in a transmit path connecting a selection terminal of the switch 26 and the selection terminal 222 of the switch 22. The transmit filter 322T is configured to pass radio-frequency signals in a sixth transmit band out of radio-frequency signals inputted from the transmit input terminal 53T.

The transmit power amplifier 43T is an example of at least one amplifier circuit coupled to at least one of the plurality of first filters 31B and the plurality of second filters 32B and configured to amplify radio-frequency signals. The transmit power amplifier 43T amplifies a radio-frequency signal inputted from the transmit input terminal 53T and outputs the amplified radio-frequency signal to any of the plurality of transmit filters. The transmit power amplifier 43T may be, for example, a power amplifier.

The control circuit 60B controls connections of the switches 21 to 26 in accordance with communication bands (frequency ranges) in use. Specifically, the control circuit 60B controls connections of the switches 21 to 26 by using a control signal (not indicated in the drawing).

More specifically, the control circuit 60B controls the switches 21 to 25 in the same manner as the control circuit 60 of the first embodiment. The control circuit 60B also controls the switch 26 to couple a transmit filter corresponding to a communication band (frequency range) in use to the transmit power amplifier 43T.

[3.3 Effects]

As described above, the radio-frequency module 1B and the communication device 5B according to the present embodiment can implement not only a receive circuit but also a transceiver circuit.

Other Embodiments

Although the radio-frequency module and communication device according to the embodiments of the present disclosure have been described above by using the embodiments and modification, the radio-frequency module and communication device according to the present disclosure are not limited to the embodiments and modification described above. The present disclosure also embraces other embodiments implemented as any combination of the constituent elements of the embodiments and modification, other modifications obtained by making various changes that occur to those skilled in the art without necessarily departing from the scope of the embodiments and modification described above, and various hardware devices including the radio-frequency module and communication device.

For example, in the radio-frequency module and communication device according to the embodiments and modification described above, another circuit element, wiring, and the like may be inserted in paths connecting any of the circuit components and signal paths that are illustrated in the drawings. For example, a matching circuit may be disposed in a path connecting a switch and a receive filter and/or a path connecting a receive filter and a receive low-noise amplifier.

It should be noted that the internal configurations (connection paths connecting the common terminal and selection terminals and the like) of the switches of the embodiments and modification described above are mere examples, and they should not be construed in a limiting sense.

Although the plurality of second filters in the embodiments and modification include only filters not supporting CA, this should not be construed in a limiting sense. For example, the plurality of second filters may include filters supporting CA (for example, filters supporting intra-band CA). In this case, the switch 22 enables two or more of the plurality of second filters to be concurrently coupled to the antenna element 2.

Although in the embodiments and modification the radio-frequency module 1 is coupled to the single antenna element 2, the radio-frequency module 1 may be coupled to a plurality of antennas. In this case, the radio-frequency module 1 may include an antenna selection switch between the plurality of antennas and the switches 21 and 22.

Although the descriptions of the embodiments and modification have been made by using CA employing a combination of two kinds of frequency ranges, this should not be construed in a limiting sense. The embodiments and modification can be used for CA employing a combination of three or more kinds of frequency ranges.

The LTE communication bands corresponding to the plurality of first filters 31 and the plurality of second filters 32 in the embodiments and modification are mere examples, and they should not be construed in a limiting sense.

Although the radio-frequency module 1B in the second embodiment includes the single transmit power amplifier 43T, the radio-frequency module 1B may include a plurality of transmit power amplifiers.

INDUSTRIAL APPLICABILITY

The present disclosure can be used as a radio-frequency module disposed at a front-end of a communication device supporting CA, and the present disclosure can be used for a wide range of communication devices including the radio-frequency module, such as mobile phones.

REFERENCE SIGNS LIST 1, 1A, 1B radio-frequency module
2 antenna element
3 radio-frequency integrated circuit (RFIC)
4 baseband integrated circuit (BBIC)
5, 5B communication device
10, 210, 220, 230, 240 common terminal
21, 22, 23, 24, 25, 25A, 26 switch
31, 31B first filters
32, 32B second filters
40R receive low-noise amplifiers
41R, 42R, 401R, 402R, 403R, 404R, 405R, 406R receive low-noise amplifier
43T transmit power amplifier
51R, 52R receive output terminal
53T transmit input terminal
60, 60A, 60B control circuit
211, 212, 213, 214, 221, 222, 231, 232, 233, 241, 242, 243 selection terminal
311R, 312R, 313R, 314R, 321R, 322R receive filter
311T, 312T, 313T, 314T, 321T, 322T transmit filter

The invention claimed is:

1. A radio-frequency module supporting carrier aggregation in which radio-frequency signals in a plurality of frequency ranges are simultaneously transmitted, simultaneously received, or simultaneously transmitted and received, the radio-frequency module comprising:
a plurality of first filters;
a plurality of second filters;
a first switch coupled to an antenna and to the plurality of first filters, and configured to selectively connect the antenna to the plurality of first filters; and
a second switch coupled to the antenna and to the plurality of second filters, and configured to selectively connect the antenna to the plurality of second filters,
wherein none of the plurality of first filters is selectively connected in combination with any of the plurality of second filters for carrier aggregation, and
wherein the first switch and the second switch have a plurality of selection terminals each connected to one of the corresponding filters.

2. The radio-frequency module according to claim 1, wherein:
at least one of the plurality of first filters is selectively connected together with another of the plurality of first filters for carrier aggregation, and
none of the plurality of second filters is selectively connected together with any of the plurality of second filters for carrier aggregation.

3. A radio-frequency module supporting carrier aggregation in which radio-frequency signals in a plurality of frequency ranges are simultaneously transmitted, simultaneously received, or simultaneously transmitted and received, the radio-frequency module comprising:
a plurality of first filters;
a plurality of second filters;
a first switch coupled to an antenna and to the plurality of first filters, and configured to selectively connect the antenna to the plurality of first filters; and
a second switch coupled to the antenna and to the plurality of second filters, and configured to selectively connect the antenna to the plurality of second filters,
wherein the first switch and the second switch are configured to prevent one or more of the plurality of first filters from being coupled to the antenna concurrently with one or more of the plurality of second filters, and
wherein the first switch and the second switch have a plurality of selection terminals each connected to one of the corresponding filters.

4. The radio-frequency module according to claim 3, wherein:
the first switch is configured to enable two or more of the plurality of first filters to be concurrently coupled to the antenna, and
the second switch is configured to prevent two or more of the plurality of second filters from being concurrently coupled to the antenna.

5. The radio-frequency module according to claim 1, further comprising:
at least one amplifier circuit coupled to at least one of the plurality of first filters or at least one of the plurality of second filters, and configured to amplify radio-frequency signals.

6. The radio-frequency module according to claim 3, further comprising:
at least one amplifier circuit coupled to at least one of the plurality of first filters or at least one of the plurality of second filters, and configured to amplify radio-frequency signals.

7. The radio-frequency module according to claim 5, wherein the at least one amplifier circuit includes at least one receive low-noise amplifier configured to amplify a radio-frequency signal inputted from the antenna via the plurality of first filters or the plurality of second filters.

8. The radio-frequency module according to claim 6, wherein the at least one amplifier circuit includes at least one receive low-noise amplifier configured to amplify a radio-frequency signal inputted from the antenna via the plurality of first filters or the plurality of second filters.

9. The radio-frequency module according to claim 7, wherein the at least one receive low-noise amplifier includes a receive low-noise amplifier coupled to two or more filters of the plurality of first filters and the plurality of second filters.

10. The radio-frequency module according to claim 8, wherein the at least one receive low-noise amplifier includes a receive low-noise amplifier coupled to two or more filters of the plurality of first filters and the plurality of second filters.

11. The radio-frequency module according to claim 7, wherein the at least one receive low-noise amplifier includes a plurality of receive low-noise amplifiers, each of the plurality of receive low-noise amplifiers coupled to a corresponding one of each of the plurality of first filters and the plurality of second filters.

12. The radio-frequency module according to claim 8, wherein the at least one receive low-noise amplifier includes a plurality of receive low-noise amplifiers, each of the plurality of receive low-noise amplifiers coupled to a corresponding one of each of the plurality of first filters and the plurality of second filters.

13. The radio-frequency module according to claim 5, wherein the at least one amplifier circuit includes at least one transmit power amplifier configured to amplify a radio-frequency signal and to output the amplified radio-frequency signal to the antenna via the plurality of first filters or the plurality of second filters.

14. The radio-frequency module according to claim 6, wherein the at least one amplifier circuit includes at least one transmit power amplifier configured to amplify a radio-frequency signal and to output the amplified radio-frequency signal to the antenna via the plurality of first filters or the plurality of second filters.

15. The radio-frequency module according to claim 1, wherein:
the plurality of first filters includes a filter having a pass band corresponding to Long Term Evolution (LTE) Band 8, a filter having a pass band corresponding to LTE Band 26, a filter having a pass band corresponding to LTE Band 20, a filter having a pass band corresponding to LTE Band 28a, a filter having a pass band corresponding to LTE Band 28b, a filter having a pass band corresponding to LTE Band 29, a filter having a pass band corresponding to LTE Band 12, or a filter having a pass band corresponding to LTE Band 13; and
the plurality of second filters includes a filter having a pass band corresponding to LTE Band 14 or a filter having a pass band corresponding to LTE Band 71.

16. The radio-frequency module according to claim 3, wherein:
the plurality of first filters includes a filter having a pass band corresponding to Long Term Evolution (LTE) Band 8, a filter having a pass band corresponding to LTE Band 26, a filter having a pass band corresponding to LTE Band 20, a filter having a pass band corresponding to LTE Band 28a, a filter having a pass band corresponding to LTE Band 28b, a filter having a pass band corresponding to LTE Band 29, a filter having a pass band corresponding to LTE Band 12, or a filter having a pass band corresponding to LTE Band 13; and
the plurality of second filters includes a filter having a pass band corresponding to LTE Band 14 or a filter having a pass band corresponding to LTE Band 71.

17. A communication device comprising:
a radio-frequency integrated circuit configured to process a radio-frequency signal received or to be transmitted by an antenna; and
the radio-frequency module according to claim 1, the radio-frequency module being configured to communicate the radio-frequency signal between the antenna and the radio-frequency integrated circuit.

18. A communication device comprising:
a radio-frequency integrated circuit configured to process a radio-frequency signal received or to be transmitted by an antenna; and
the radio-frequency module according to claim 3, the radio-frequency module being configured to communicate the radio-frequency signal between the antenna and the radio-frequency integrated circuit.

* * * * *